(12) United States Patent
Li et al.

(10) Patent No.: US 12,341,152 B2
(45) Date of Patent: *Jun. 24, 2025

(54) ALL SOLID STATE BATTERY

(71) Applicant: TOYOTA JIDOSHA KABUSHIKI KAISHA, Toyota Aichi-ken (JP)

(72) Inventors: Ximeng Li, Susono Shizuoka-ken (JP); Masumi Sato, Toyota Aichi-ken (JP); Sakina Kaneko, Susono Shizuoka-ken (JP); Tomoya Matsunaga, Susono Shizuoka-ken (JP); Mitsutoshi Otaki, Susono Shizuoka-ken (JP); Satoshi Wakasugi, Susono Shizuoka-ken (JP); Hideaki Nishimura, Sunto-gun Shizuoka-ken (JP); So Yubuchi, Susono Shizuoka-ken (JP); Shohei Kawashima, Susono Shizuoka-ken (JP); Jun Yoshida, Mishima Shizuoka-ken (JP)

(73) Assignee: TOYOTA JIDOSHA KABUSHIKI KAISHA, Toyota Aichi-Ken (JP)

( * ) Notice: Subject to any disclaimer, the term of this patent is extended or adjusted under 35 U.S.C. 154(b) by 438 days.

This patent is subject to a terminal disclaimer.

(21) Appl. No.: 17/724,059

(22) Filed: Apr. 19, 2022

(65) Prior Publication Data
US 2022/0344666 A1  Oct. 27, 2022

(30) Foreign Application Priority Data
Apr. 27, 2021 (JP) .................................. 2021-074698

(51) Int. Cl.
H01M 10/0562 (2010.01)
H01M 4/36 (2006.01)
(Continued)

(52) U.S. Cl.
CPC ....... *H01M 10/0562* (2013.01); *H01M 4/366* (2013.01); *H01M 4/628* (2013.01);
(Continued)

(58) Field of Classification Search
CPC ............. H01M 4/366; H01M 10/0562; H01M 10/054; H01M 2300/0071; H01M 2300/0065
See application file for complete search history.

(56) References Cited

U.S. PATENT DOCUMENTS 5,162,178 A     11/1992  Ohsawa et al.
10,547,040 B2 *  1/2020  Park ....................... H01M 50/11
(Continued)

FOREIGN PATENT DOCUMENTS

CN   112928278 A  *  6/2021
JP   2001-196052 A    7/2001
(Continued)

OTHER PUBLICATIONS

Non-Final Office Action dated Jan. 7, 2025, issued to U.S. Appl. No. 17/725,167.
(Continued)

*Primary Examiner* — Amanda C. Walke
(74) *Attorney, Agent, or Firm* — Dinsmore & Shohl LLP

(57) ABSTRACT

A main object of the present disclosure is to provide an all solid state battery in which occurrence of short circuit is inhibited. The present disclosure achieves the object by providing an all solid state battery including an anode including at least an anode current collector, a cathode, and a solid electrolyte layer arranged between the anode and the cathode; wherein a protective layer containing a Mg-containing particle that contains at least Mg, and also contains a polymer, is arranged between the anode current collector and the solid electrolyte layer; and a contacting area rate in
(Continued)

an interface between the solid electrolyte layer and the protective layer is 50% or more.

1 Claim, 1 Drawing Sheet

(51) Int. Cl.
*H01M 4/62* (2006.01)
*H01M 10/052* (2010.01)
*H01M 10/0585* (2010.01)
*H01M 50/586* (2021.01)
*H01M 4/02* (2006.01)

(52) U.S. Cl.
CPC ..... *H01M 10/052* (2013.01); *H01M 10/0585* (2013.01); *H01M 50/586* (2021.01); *H01M 2004/027* (2013.01)

(56) References Cited

U.S. PATENT DOCUMENTS

| | | | |
|---|---|---|---|
| 10,879,527 B2 * | 12/2020 | Laramie | H01M 50/449 |
| 11,469,445 B2 * | 10/2022 | Li | H01M 4/131 |
| 11,581,530 B2 * | 2/2023 | Laramie | H01M 10/0525 |
| 11,588,178 B2 * | 2/2023 | Li | H01M 10/0562 |
| 2002/0114993 A1 | 8/2002 | Miyaki et al. | |
| 2015/0010804 A1 * | 1/2015 | Laramie | H01M 4/1395 429/144 |
| 2017/0301957 A1 * | 10/2017 | Park | H01M 10/0436 |
| 2019/0190064 A1 | 6/2019 | Fujiki et al. | |
| 2020/0343582 A1 | 10/2020 | Li et al. | |
| 2021/0119203 A1 | 4/2021 | Kim et al. | |
| 2022/0334706 A1 * | 10/2022 | Guo | G06T 19/006 |
| 2022/0344791 A1 * | 10/2022 | Li | H01M 4/134 |

FOREIGN PATENT DOCUMENTS

| | | | | |
|---|---|---|---|---|
| JP | 2020-184407 A | | 11/2020 | |
| KR | 20170070239 A | * | 6/2017 | |
| WO | WO-2018184010 A1 | * | 10/2018 | C04B 35/01 |

OTHER PUBLICATIONS

Notice of Allowance dated Jan. 23, 2025, issued to U.S. Appl. No. 17/725,153.

Final Office Action dated Apr. 24, 2025, issued to U.S. Appl. No. 17/725,167.

* cited by examiner

ALL SOLID STATE BATTERY

CROSS-REFERENCE TO RELATED APPLICATIONS

This application claims priority to Japanese Patent Application No. 2021-074698, filed on Apr. 27, 2021, the entire contents of which are incorporated by reference herein.

TECHNICAL FIELD

The present disclosure relates to an all solid state battery.

BACKGROUND

An all solid state battery is a battery including a solid electrolyte layer between a cathode and an anode, and one of the advantages thereof is that the simplification of a safety device may be more easily achieved compared to a liquid-based battery including a liquid electrolyte containing a flammable organic solvent.

For example, Patent Literature 1 discloses an all solid state battery comprising, between an anode active material layer and a solid electrolyte layer, a protective layer that includes a composite metal oxide represented by Li-M-O, provided that M is at least one kind of metal elements selected from the group consisting of Mg, Au, Al and Sn.

CITATION LIST

Patent Literature

Patent Literature 1: Japanese Patent Application Laid-Open (JP-A) No. 2020-184407

SUMMARY

Technical Problem

From the viewpoint of improving safety of an all solid state battery, occurrence of short circuit is preferably inhibited. The present disclosure has been made in view of the above circumstances and a main object thereof is to provide an all solid state battery in which occurrence of short circuit is inhibited.

Solution to Problem

In order to achieves the object, the present disclosure provides an all solid state battery comprising an anode including at least an anode current collector, a cathode, and a solid electrolyte layer arranged between the anode and the cathode; wherein a protective layer containing a Mg-containing particle that contains at least Mg, and also containing a polymer, is arranged between the anode current collector and the solid electrolyte layer; and a contacting area rate in an interface between the solid electrolyte layer and the protective layer is 50% or more.

According to the present disclosure, a protective layer containing a Mg-containing particle and a polymer is arranged between the anode current collector and the solid electrolyte layer, and the contacting area in the interface between the protective layer and the solid electrolyte layer is the specified value or more, and thus the occurrence of short circuit may be inhibited in the all solid state battery.

Advantageous Effects of Disclosure

The present disclosure exhibits an effect of providing an all solid state battery in which occurrence of short circuit is inhibited.

DETAILED DESCRIPTION

The all solid state battery in the present disclosure will be hereinafter explained in details.

Figure 1:
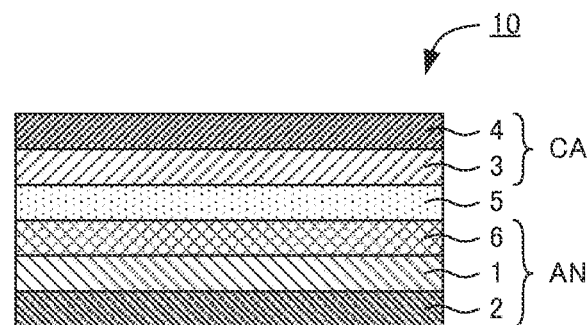
FIG. 1 is a schematic cross-sectional view illustrating an example of the all solid state battery in the present disclosure.

FIG. 1 is a schematic cross-sectional view illustrating an example of the all solid state battery in the present disclosure. All solid state battery 10 illustrated in FIG. 1 includes anode AN including anode active material later 1 and anode current collector 2, cathode CA including cathode active material layer 3 and cathode current collector 4, and solid electrolyte layer 5 arranged between the anode AN and the cathode CA. Further, in FIG. 1, between the anode active material layer 1 and the solid electrolyte layer 5, protective layer 6 that includes a Mg-containing particle containing at least Mg, and also includes a polymer, is arranged. Also, the contacting area rate in the interface between the solid electrolyte layer 5 and the protective layer 6 is the specified value or more. Incidentally, as shown in FIG. 1, the protective layer 6 may be regarded as a constituent element of the anode AN.

Figure 2:
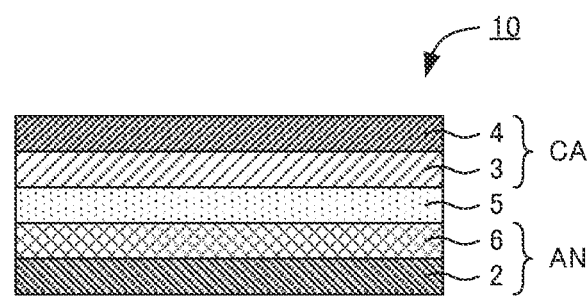
FIG. 2 is a schematic cross-sectional view illustrating an additional example of the all solid state battery in the present disclosure.

FIG. 2 is a schematic cross-sectional view illustrating an additional example of the all solid state battery in the present disclosure. As shown in FIG. 2, all solid state battery 10 may not include an anode active material layer, and anode current collector 2 and protective layer 6 may directly contact with each other. Also, when the all solid state battery shown in FIG. 2 is charged and lithium is deposited between the anode current collector 2 and the protective layer 6, the anode active material layer 1 (deposited lithium layer) shown in FIG. 1 is obtained. In other words, the all solid state battery in the present disclosure may be a battery utilizing deposition-dissolution reactions of a metal lithium.

In Patent Literature 1, in an all solid state battery utilizing deposition-dissolution reactions of a metal lithium as an anode reaction, a protective layer containing a composite metal oxide Li-M-O is arranged between the anode active material layer and the solid electrolyte layer, so as to protect from deterioration of the solid electrolyte due to the metal lithium and to suppress an interface resistance between the anode active material layer and the solid electrolyte layer. Also, in Patent Literature 1, vapor-deposition of the metal element M onto the anode current collector is carried out to charge, and bring into a reaction with Li, so as to form a protective layer containing the composite metal oxide.

Here, in the all solid state battery utilizing the deposition-dissolution reactions of a metal lithium as an anode reaction, the metal included in the protective layer also expands and contracts due to intercalation and desorption of Li. For this reason, the protective layer as in Patent Literature 1 has a risk of generation of a crack. When a crack is generated in the protective layer, there is a risk that short circuit may proceed from the crack. In contrast, the protective layer in the present disclosure contains a polymer, and thus the crack of the protective layer can be inhibited. Also, in an all solid state battery including a protective layer, adhesiveness in the interface between the solid electrolyte layer and the protective layer is considered to be important. The reason therefor is, when the adhesive area is large, dendrite deposition of Li can be prevented since the interface between the solid electrolyte layer and the protective layer is to be a resistance layer. In the present disclosure, the contacting area rate in the interface between the solid electrolyte layer and the protective layer is the specified rate, and thus the short circuit may be inhibited. Also, the protective layer in the present disclosure is capable of suppressing the interface resistance between the anode active material layer and the solid electrolyte layer similarly to Patent Literature 1.

1. Protective Layer

The protective layer in the present disclosure is a layer arranged between the later described anode current collector and solid electrolyte layer, and contains a Mg-containing particle containing at least Mg, and also contains a polymer. Also, a contacting area rate in the interface with the solid electrolyte layer is the specified value or more. The contacting area rate will be described later.

The Mg-containing particle contains at least Mg. The Mg-containing particle may be a particle of a simple substance of Mg, and may be a particle containing Mg and an element other than Mg. Examples of the element other than Mg may include Li and a metal (including half metal) other than Li. Also, an additional example of the element other than Mg may be non-metal such as O.

The Mg-containing particle may be an alloy particle containing Mg and a metal other than Mg. The alloy particle is, in embodiments, an alloy containing Mg as a main component. Examples of a metal M other than Mg in the alloy particle may include Li, Au, Al and Ni. The alloy particle may contain just one kind of the metal M, and may contain two kinds or more of the metal M. Also, the Mg-containing particle may or may not contain Li. In the former case, the alloy particle may include an alloy of β single phase of Li and Mg.

The Mg-containing particle may be an oxide particle containing Mg and O. Examples of the oxide particle may include an oxide of a simple substance of Mg, and a composite metal oxide represented by Mg-M'-O, provided that M' is at least one of Li, Au, Al and Ni. In embodiments, the oxide particle contains at least Li as M'. M' may or may not contain a metal other than Li. In the former case, M' may be one kind of metal other than Li, and may be two or more kinds. Meanwhile, the Mg-containing particle may not contain O.

The Mg-containing particle may be a primary particle, and may be a secondary particle which is aggregation of the primary particles. Also, the average particle size $D_{50}$ of the Mg-containing particle is small, in embodiments. When the average particle size is small, the dispersibility of the Mg-containing particle in the protective layer improves, and reaction point with Li increases; thus, it is effective to inhibit short circuit. The average particle size ($D_{50}$) of the Mg-containing particle is, for example, 500 nm or more, and may be 800 nm or more. Meanwhile, the average particle size ($D_{50}$) of the Mg-containing particle is, for example, 20 μm or less, may be 10 μm or less, and may be 5 μm or less.

The proportion of the Mg-containing particle in the protective layer is, for example, 50 weight % or more, may be 60 weight % or more, and may be 80 weight % or more. Meanwhile, the proportion of the Mg-containing particle is, for example, 99 weight % or less, and may be 90 weight % or less. Also, the Mg-containing particle expands and contracts when Li is intercalated and desorbed. In this point, the Mg-containing particle may be regarded as an active material. In embodiments, the protective layer contains just the Mg-containing particle as an active material, but, in alternative embodiments, may contain an additional active material particle. The proportion of the Mg-containing particle with respect to all the active materials included in the protective layer is, for example, 50 weight % or more, may be 70 weight % or more, and may be 90 weight % or more.

Examples of the polymer (binder) may include a fluorine-based binder and a rubber-based binder. Examples of the fluorine-based binder may include polyvinylidene fluoride (PVDF) and polytetra fluoroethylene (PTFE). Also, examples of the rubber-based binder may include butadiene rubber (BR), acrylate butadiene rubber (ABR), and styrene butadiene rubber (SBR).

The proportion of the polymer in the protective layer is not particularly limited, but for example, it is 10 weight % or less, may be 5 weight % or less, may be 3 weight % or less, and may be 1 weight % or less. Meanwhile, the proportion of the polymer is, for example, 0.1 weight % or more.

Also, in the present disclosure, the contacting area rate in the interface between the solid electrolyte layer and the protective layer is the specified value or more. "The contacting area rate in the interface between the solid electrolyte layer and the protective layer" refers to, in the solid electrolyte layer side surface of the protective layer, an area rate contacting the solid electrolyte layer among an area in the region that overlaps with the solid electrolyte layer in a plan view. The contacting area rate is 50% or more, may be 60% or more, and may be 70% or more. Meanwhile, the contacting area rate is, for example, 100% or less, may be 95% or less, may be 90% or less, and may be 80% or less. The contacting area can be obtained by, for example, observation with microscope. In specific, the area can be obtained by observation with a scanning electron microscope (SEM) and a laser microscope. The contacting area may be adjusted by, for example, changing pressing pressure to be applied to the protective layer, and the kind and the ratio of a binder in the protective layer.

The thickness of the protective layer is not particularly limited, and for example, it is 5 μm or more, and may be 15 μm or more. Meanwhile, the thickness of the protective layer is, for example, 100 μm or less, may be 50 μm or less, and may be 30 μm or less. Examples of the method for forming the protective layer may include a method of pasting and drying a mixture containing the Mg-containing particle, a polymer and a dispersion medium. Also, as required, pressing pressure may be applied to the protective layer. The pressing pressure is not particularly limited if the above described contacting area rate can be obtained; for example, it is 450 MPa or more and 600 MPa or less.

2. Anode

The anode in the present disclosure includes at least an anode current collector. As described above, the anode may or may not include an anode active material layer.

When the anode includes an anode active material layer, the anode active material layer, in embodiments, contains at least one of a simple substance of Li and a Li alloy as an anode active material. Incidentally, in the present disclosure, a simple substance of Li and a Li alloy may be referred to as a Li-based active material in general. When the anode active material layer contains the Li-based active material, the Mg-containing particle in the protective layer may or may not contain Li.

For example, in an all solid state battery produced by using a Li foil or a Li alloy foil as the anode active material, and using a particle of simple substance of Mg as the Mg-containing particle, the simple substance of Mg is presumed to be alloyed with Li at the time of initial discharge. Meanwhile, in an all solid state battery produced by not arranging an anode active material layer, but using a particle of simple substance of Mg as the Mg-containing particle, and using a cathode active material containing Li, the simple substance of Mg is presumed to be alloyed with Li at the time of initial charge.

The anode active material layer may contain just one of a simple substance of Li and a Li alloy as the Li-based active material, and may contain the both of a simple substance of Li and a Li alloy.

In embodiments, the Li alloy is an alloy containing a Li element as a main component. Examples of the Li alloy may include Li—Au, Li—Mg, Li—Sn, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At. The Li alloy may be just one kind, and may be two kinds or more.

Examples of the shape of the Li-based active material may include a foil shape and a granular shape. Also, the Li-based active material may be a deposited metal lithium. As described above, the protective layer contains a polymer (binder), but the anode active material layer may not contain a binder.

The thickness of the anode active material layer is not particularly limited; for example, it is 1 nm or more and 1000 µm or less, and may be 1 nm or more and 500 µm or less.

Also, examples of the material for the anode current collector may include Cu, Ni, In, Al and C. Examples of the shape of the anode current collector may include a foil shape, a mesh shape, and a porous shape.

3. Cathode

In embodiments, the cathode in the present disclosure includes a cathode active material layer and a cathode current collector. The cathode active material layer in the present disclosure is a layer containing at least a cathode active material. Also, the cathode active material layer may contain at least one of a solid electrolyte, a conductive material, and a binder, as required.

The cathode active material is not particularly limited if it is an active material having higher reaction potential than that of the anode active material, and cathode active materials that can be used in an all solid state battery may be used. The cathode active material may or may not contain a lithium element.

Examples of the cathode active material containing a lithium element may include a metal lithium (Li), a lithium alloy, a lithium oxide and other lithium compounds.

In embodiments, the Li alloy is an alloy containing a Li element as a main component. Examples of the Li alloy may include Li—Au, Li—Mg, Li—Sn, Li—Si, Li—Al, Li—Ge, Li—Sb, Li—B, Li—C, Li—Ca, Li—Ga, Li—As, Li—Se, Li—Ru, Li—Rh, Li—Pd, Li—Ag, Li—Cd, Li—Ir, Li—Pt, Li—Hg, Li—Pb, Li—Bi, Li—Zn, Li—Tl, Li—Te, Li—At and Li—In.

Examples of the lithium oxide may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $Li_4Ti_5O_{12}$, $LiMn_2O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$; and an olivine type active material such as $LiFePO_4$, $LiMnPO_4$, $LiNiPO_4$ and $LiCoPO_4$.

Examples of other lithium compounds may include $LiCoN$, $Li_2SiO_3$, $Li_4SiO_4$, lithium sulfide ($Li_2S$) and lithium polysulfide ($Li_2Sx$; $2 \leq x \leq 8$).

Examples of the cathode active material not including a lithium element may include a transition metal oxide such as $V_2O_5$ and $MoO_3$; a S-based active material such as S and $TiS_2$; a Si-based active material such as Si and $SiO_2$; and a lithium storing intermetallic compound such as $Mg_2Sn$, $Mg_2Ge$, $Mg_2Sb$ and $Cu_3Sb$.

Also, a coating layer containing an ion conductive oxide may be formed on the surface of the cathode active material. The coating layer prevents the reaction of the cathode active material and the solid electrolyte, and thus the all solid state battery may have excellent output properties. Examples of the Li-ion conductive oxide may include $LiNbO_3$, $Li_4Ti_5O_{12}$, and $Li_3PO_4$.

The proportion of the cathode active material in the cathode active material layer is, for example, 20 weight % or more, may be 30 weight % or more and may be 40 weight % or more. Meanwhile, the proportion of the cathode active material is, for example, 80 weight % or less, may be 70 weight % or less, and may be 60 weight % or less.

Examples of the conductive material may include a carbon material. Specific examples of the carbon material may include acetylene black, Ketjen black, VGCF and graphite. The solid electrolyte is in the same contents as those described in "4. Solid electrolyte layer". The binder is in the same contents as those described in "1. Protective layer". Also, the thickness of the cathode active material layer is, for example, 0.1 µm or more and 1000 µm or less.

Also, examples of the material for the cathode current collector may include Al, Ni and C. Examples of the shape of the cathode current collector may include a foil shape, a mesh shape, and a porous shape.

4. Solid Electrolyte Layer

The solid electrolyte layer in the present disclosure is a layer containing at least a solid electrolyte. Also, the solid electrolyte layer may contain a binder as required.

Examples of the solid electrolyte may include an inorganic solid electrolyte such as a halide solid electrolyte, a sulfide solid electrolyte, an oxide solid electrolyte, and a nitride solid electrolyte. In embodiments, the solid electrolyte is a sulfide solid electrolyte.

In embodiments, the sulfide solid electrolyte contains, for example, a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the shape of the solid electrolyte may include a granular shape.

Examples of the sulfide solid electrolyte may include $Li_2S$—$P_2S_5$, $Li_2S$—$P_2S_5$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$—$P_2S_5$—LiI—LiBr, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m, n is a positive number and Z is one of Ge, Zn and Ga), $Li_2S$—$GeS_2$, $Li_2S$—$SiS_2$—$Li_3PO_4$, $Li_2S$—$SiS_2$—$Li_xMO_y$ (provided that x, y is a positive number and M is one of P, Si, Ge, B, Al, Ga and In).

The solid electrolyte may be in a glass shape, and may include a crystal phase. Examples of the shape of the solid electrolyte may include a granular shape. The average particle size ($D_{50}$) of the solid electrolyte is, for example, 0.01 µm or more. Meanwhile, the average particle size ($D_{50}$) of the solid electrolyte is, for example, 10 µm or less, and may be 5 μm or less. Ion conductivity of the solid electrolyte at 25° C. is, for example, $1*10^{-4}$ S/cm or more, and may be $1*10^{-3}$ S/cm or more.

The binder is in the same contents as those described in "1. Protective layer"; thus, the descriptions herein are omitted. Also, the thickness of the solid electrolyte layer is, for example, 0.1 μm or more and 1000 μm or less.

5. Other Constitutions

The all solid state battery in the present disclosure may further include a restraining jig that applies a restraining pressure along with the thickness direction of the cathode, the solid electrolyte layer and the anode. As the restraining jig, known jigs may be used. The restraining pressure is, for example, 0.1 MPa or more and may be 1 MPa or more. Meanwhile, the restraining pressure is, for example, 50 MPa or less, may be 20 MPa or less, may be 15 MPa or less, and may be 10 MPa or less. The smaller the restraining pressure, the more the increase in size of the restraint jig can be suppressed. Meanwhile, the smaller the restraining pressure, the more easily short circuit occurs; however, arrangement of the protective layer in the present disclosure inhibits the occurrence of short circuit.

6. All Solid State Battery

The kind of the all solid state battery in the present disclosure is not particularly limited, but is typically a lithium ion battery. Also, the all solid state battery in the present disclosure may be a primary battery and may be a secondary battery. In embodiments, the all solid state battery may be a secondary battery. The reason therefor is to be repeatedly charged and discharged and useful as a car-mounted battery for example.

The all solid state battery in the present disclosure may be a single battery and may be a layered battery. The layered battery may be a monopolar layered battery (layered battery connected in parallel), and may be a bipolar layered battery (layered battery connected in series). Examples of the shape of the battery may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Formation of Protective Layer>

To a container made of PP (polypropylene), heptane, a heptane solution containing 5 weight % or butadiene rubber, and Mg particle (simple substance of Mg, average particle size: 800 nm, from EM Japan Co., Ltd.) were added, and agitated for 30 seconds by an ultrasonic dispersion device (UH-50 from SMT Corporation). Next, the container was shaken for 30 minutes by a shaker (TTM-1 from SIBATA SCIENTIFIC TECHNOLOGY LTD.). Thereby, a mixture for a protective layer was prepared. The mixture was pasted on a substrate (Al foil) by a blade method using an applicator. Then, the pasted mixture was dried for 30 minutes on a hot plate at 100° C. Thereby, a protective layer with the substrate was obtained.

<Production of Anode>

A Li foil that was used as an anode active material was placed on an anode current collector (Cu foil), and pressed at 100 MPa. Thereby, an anode including an anode current collector and an anode active material layer was obtained.

A cathode active material (simple substance of sulfur), a sulfide ($P_2S_5$) and a binder (VGCF) were weighed so as to be $S:P_2S_5:VGCF=52.3:19.2:28.3$ in the weight ratio. These were mixed for 15 minutes with an agate mortar to obtain a raw material mixture. The raw material mixture was put into a container (45 mL, made of $ZrO_2$) of a planetary ball mill, $ZrO_2$ ball ($\varphi=4$ mm, 96 g) was further put thereinto, and the container was completely sealed. This container was installed to a planetary ball machine (P7 from Fritsch), and a cycle of: mechanical milling (revolution speed: 510 rpm) for 1 hour, stop for 15 minutes, mechanical milling in reverse revolution (revolution speed: 510 rpm) for 1 hour, stop for 15 minutes, was repeated for total 48 hours. Thereby, a cathode mixture was obtained.

Mesitylene and a mesitylene solution containing 5 weight % of SBR were put into a container, shaken for 3 minutes by a shaker (TTM-1 from SIBATA SCIENTIFIC TECHNOLOGY LTD.), and mixed for 30 seconds by an ultrasonic dispersion device (UH-50 from SMT Corporation). The cathode mixture was put into the container, mixed for 30 seconds by the ultrasonic dispersion device, and shaken for 3 minutes by the shaker. This operation was repeated twice. After that, the product was pasted on a current collector (roughen Al foil) using an applicator with 240 μm pasting gap. After that, the product was dried for 30 minutes on a hot plate at 165° C. Thereby, a cathode including a cathode current collector and a cathode active material layer was obtained.

A sulfide solid electrolyte ($Li_2$—$P_2S_5$-based solid electrolyte including LiI—LiBr), a binder (heptane solution containing 5 weight % of ABR), and a dispersion medium (butyl butyrate) were added to a PP container. The substances in the container were mixed for 30 seconds by an ultrasonic dispersion device, shaken for 3 minutes by a shaker, and further mixed for 30 seconds by an ultrasonic dispersion device. Thereby, a mixture for a solid electrolyte layer was obtained. The mixture was pasted on a substrate (Al foil) by a blade method using an applicator. After that, the product was dried for 30 minutes on a hot plate at 150° C. Thereby, a transfer member including the substrate and the solid electrolyte layer was obtained.

The cathode and the transfer member were layered so that the cathode active material layer and the solid electrolyte layer contacted with each other, pressed at 600 MPa, and the substrate (Al foil) was peeled off to obtain a layered body 1. Next, the layered body 1 and the protective layer with the substrate were layered so that the solid electrolyte layer and the protective layer contacted with each other, pressed at 600 MPa, and the substrate (Al foil) was peeled off to obtain a layered body 2. Next, the anode and the layered body 2 were layered so that the anode active material layer and the protective layer contacted with each other, and pressed at 100 MPa to obtain an electrode body. This electrode body was sealed in a laminate film, and restrained at 10 MPa by a restraining member. Thereby, an all solid state battery was produced.

Example 2

An all solid state battery was produced in the same manner as in Example 1 except that the pressing pressure in the production of the layered body 2 was changed to 450 MPa.

Comparative Example 1

A layered body 1, an anode and a protective layer with a substrate were obtained in the same manner as in Example 1. The anode and the protective layer with the substrate were layered so that the anode active material layer and the protective layer contacted with each other, pressed at 100 MPa, and the substrate was peeled off to obtain a layered body 3. The layered body 1 and the layered body 3 were layered so that the solid electrolyte layer and the protective layer contacted with each other, and pressed at 100 MPa to obtain an electrode body. An all solid state battery was produced in the same manner as in Example 1 except that this electrode body was used.

Comparative Example 2

$Li_2S$—$P_2S_5$-based material containing LiBr and LiI was prepared as a sulfide solid electrolyte, and the sulfide solid electrolyte was pressed at the pressure of 6 ton/cm$^2$ to form a solid electrolyte layer. Next, a metal magnesium layer was formed on the solid electrolyte layer with an electron beam vapor deposition device. Next, a metal Li foil was arranged on one surface of the solid electrolyte layer, a Cu foil was arranged on the metal magnesium layer, and pressure-molded at the pressure of 1 ton/cm$^2$, and pressed at 100 MPa. Thereby, a layered body including layers in the order of, the metal Li foil, the solid electrolyte layer, the metal magnesium layer, and the Cu foil, was obtained. The obtained layered body was charged at the constant current of 435 μA/cm$^2$ current density, and thereby an anode active material layer including a LiMg alloy was formed. An all solid state battery using the LiMg alloy as the anode active material was produced in this manner.

Comparative Example 3

A metal magnesium layer was formed on an anode current collector (Cu foil) by using an electron beam vapor deposition device. Next, $Li_2S$—$P_2S_5$-based material containing LiBr and LiI as a sulfide solid electrolyte was prepared, the sulfide solid electrolyte was pressed at the pressure of 6 ton/cm$^2$ to form a solid electrolyte layer. Next, a metal Li foil was arranged on one surface of the solid electrolyte layer, the metal magnesium layer was arranged on the other surface, pressure-molded at the pressure of 1 ton/cm$^2$, and pressed at 100 MPa. Thereby, a layered body including layers in the order of, the Li metal foil, the solid electrolyte layer, the metal magnesium layer, and the Cu foil, was obtained. The obtained layered body was charged at the constant current of 435 μA/cm$^2$ current density, and thereby an anode active material layer including a LiMg alloy was formed. An all solid state battery using the LiMg alloy as the anode active material was produced in this manner.

Evaluation

<Calculation of Contacting Area Rate>
Cross-section processing of the all solid state batteries produced in Examples 1, 2 and Comparative Examples 1 to 3 was respectively conducted, the interface between the solid electrolyte layer and the protective layer was respectively observed with SEM, and the contacting area rate was respectively obtained.
<Charge and Discharge Test>
A charge and discharge test was respectively conducted to all solid state batteries produced in Examples 1, 2 and Comparative Examples 1 to 3 in the following manners. First, the battery was respectively constant current-constant voltage (CC-CV) discharged at 10 hour rate (0.1 C) until 1.5 V. After that, the battery was respectively charged at 10 hour rate (0.1 C) until 3.0 V. Since the inclination of the charge curves changes when short circuit occurs, the short circuit capacity was defined until that point, and the short circuit capacity was respectively measured.
<Li Ratio Measurement>
The Li ratio (atomic ratio of Li with respect to all metals in the anode layer and the protective layer) in the all solid state battery when fully charged (SOC: 100%) was respectively calculated. For the calculation of the Li ratio, the method described in JP-A No. 2020-184513 was used. The results are shown in Table 1.

TABLE 1

| | Protective layer | Pressing pressure to protective layer (MPa) | Contacting area rate (%) | Short circuit capacity (mAh) | Li ratio when battery is fully charged (%) |
|---|---|---|---|---|---|
| Comp. Ex. 1 | Mg | 100 | 34 | 0.62 | 75 |
| Comp. Ex. 2 | Mg | 100 | <50 | — | — |
| Comp. Ex. 3 | Mg | 100 | 100 | 0.34 | 90 |
| Example 1 | Mg | 600 | 90 | 3.0 | 75 |
| Example 2 | Mg | 450 | 67 | 2.5 | 63 |

As shown in Table 1, it was confirmed that the short circuit capacity of Examples 1 and 2 was respectively larger than that of Comparative Examples 1 to 3, and the short circuit was inhibited. It was presumed that the dendrite deposition of Li was prevented in Examples 1 and 2, since the contacting area rate in the interface between the solid electrolyte layer and the protective layer was 50% or more and the area rate that was the resistance layer in the surface of the protective layer was large. Also, the short circuit capacity of Comparative Example 3 was lower than that of Examples 1 and 2 although the contacting area rate was 100%. This is presumably because the protective layer did not contain a polymer and the flexibility of the protective layer was low to cause a crack in the protective layer. Also, it was suggested that the Li ratio when the battery was fully charged was preferably 63% or more and 75% or less.

REFERENCE SIGNS LIST 1 anode active material layer
2 anode current collector
3 cathode active material layer
4 cathode current collector
5 solid electrolyte layer
6 protective layer
10 all solid state battery

What is claimed is:
1. An all solid state battery comprising an anode including at least an anode, a cathode, and a solid electrolyte layer arranged between the anode and the cathode; wherein:
the anode comprises an anode current collector and an anode active material layer, the anode active material layer comprising a LiMg alloy and a thickness of the anode active material layer is 1 nm or more and 1000 μm or less;
the cathode comprises a cathode current collector and a cathode active material layer, the cathode active material layer comprising at least a cathode active material, and at least one of a solid electrolyte, a conductive material, and a binder, the cathode active material in the cathode active material layer is 20 wt. % or more;

a protective layer containing a Mg-containing particle that contains at least Mg, and also contains a polymer, is arranged between the anode current collector and the solid electrolyte layer; and a contacting area rate in an interface between the solid electrolyte layer and the protective layer is 50% or more.

\* \* \* \* \*